Figure 1:
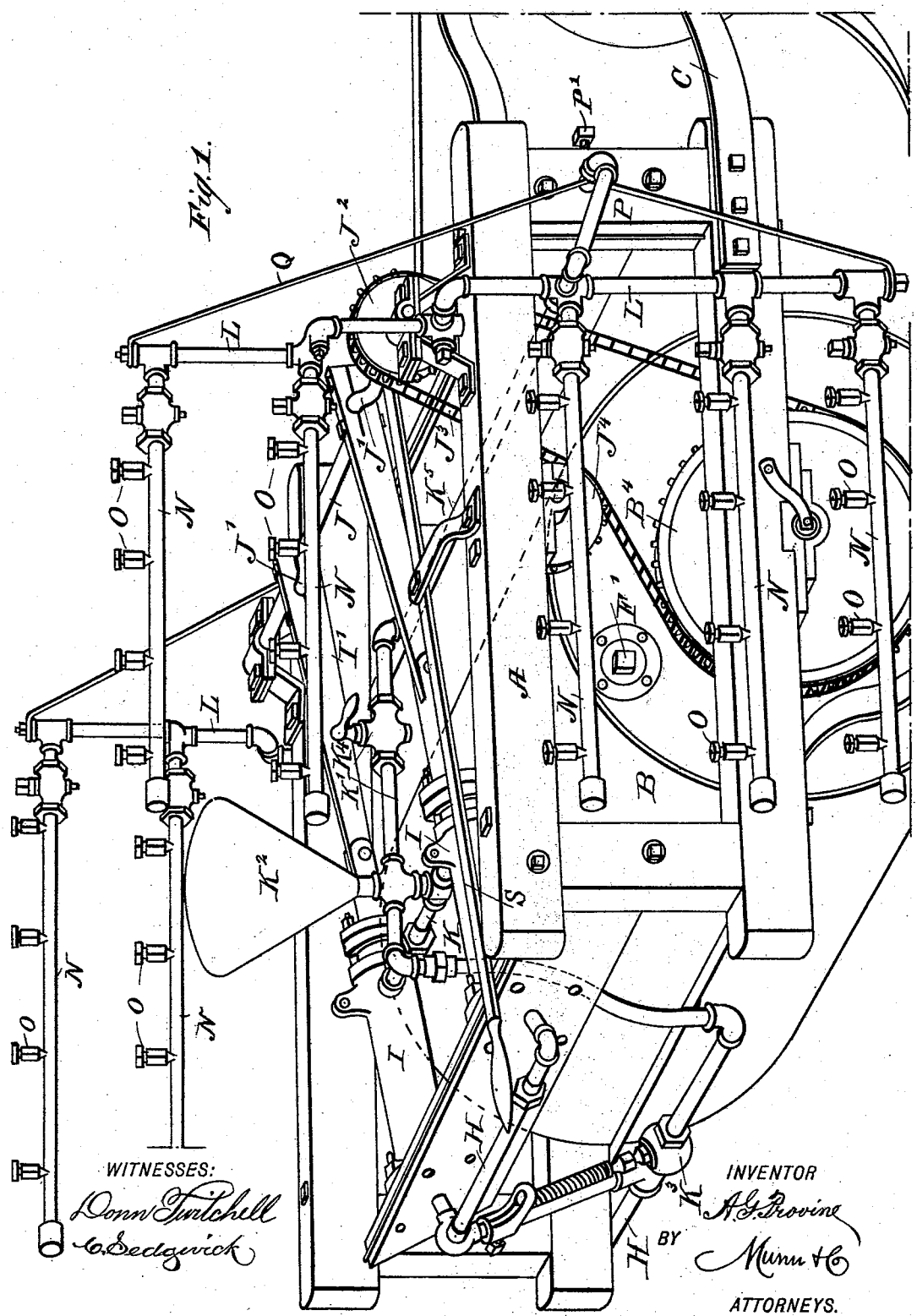

(No Model.)  2 Sheets—Sheet 1.

A. G. PROVINE.
SPRAYER.

No. 498,696. Patented May 30, 1893.

WITNESSES:
Donn Twitchell
C. Sedgwick

INVENTOR
A. G. Provine
BY
Munn & Co
ATTORNEYS.

(No Model.) 2 Sheets—Sheet 2.
A. G. PROVINE.
SPRAYER.
No. 498,696. Patented May 30, 1893.
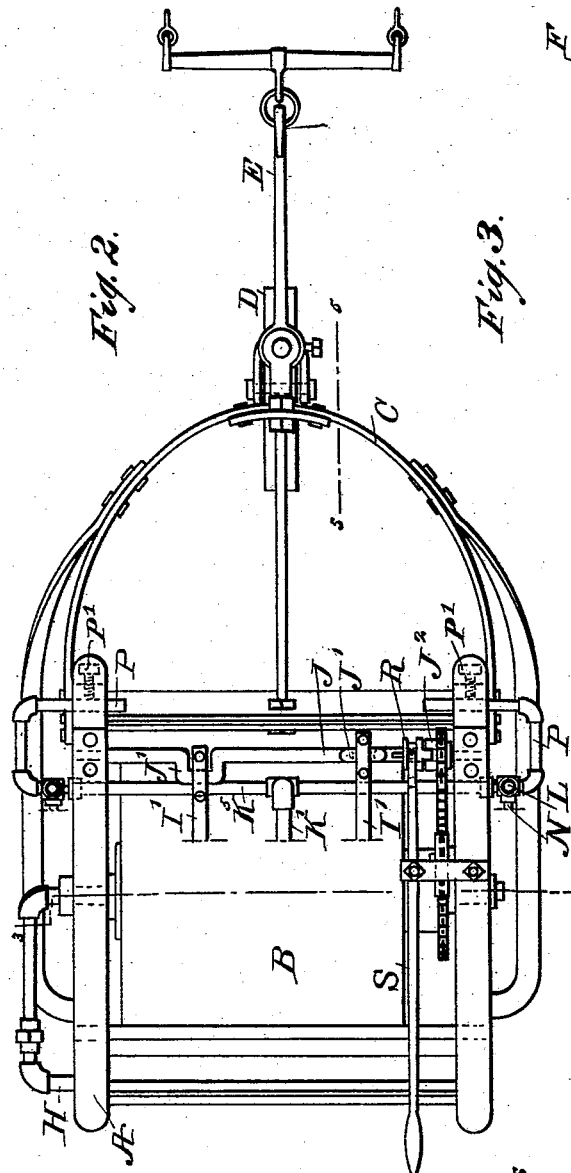
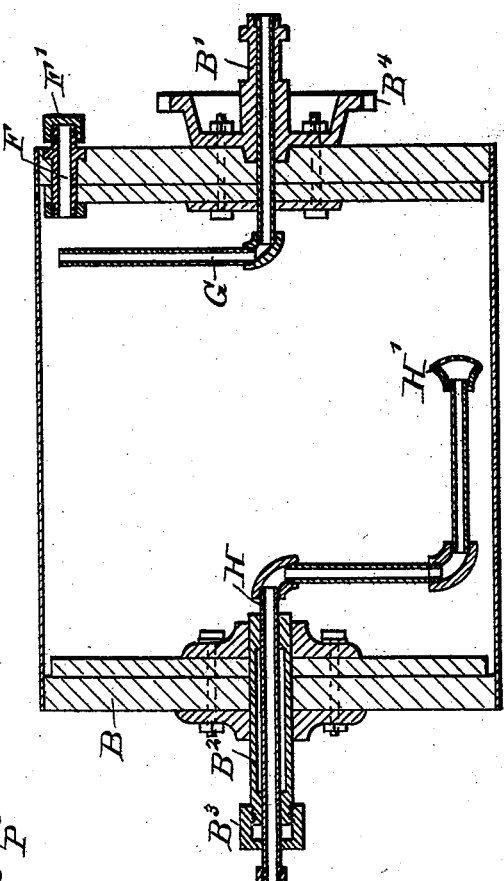
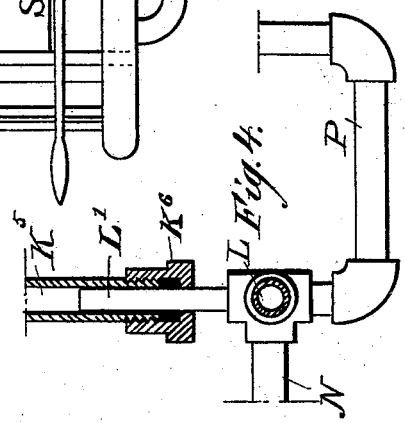
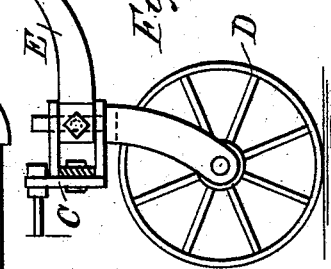
WITNESSES:
Donn Twitchell
C. Sedgwick
INVENTOR
A. G. Provine
BY
Munn & Co
ATTORNEYS.

UNITED STATES PATENT OFFICE.

ALBERT G. PROVINE, OF PUYALLUP, WASHINGTON.

SPRAYER.

SPECIFICATION forming part of Letters Patent No. 498,696, dated May 30, 1893.

Application filed December 10, 1892. Serial No. 454,713. (No model.)

*To all whom it may concern:*

Be it known that I, ALBERT G. PROVINE, of Puyallup, in the county of Pierce and State of Washington, have invented a new and Improved Sprayer, of which the following is a full, clear, and exact description.

The object of the invention is to provide a new and improved sprayer, which is simple and durable in construction, very effective in operation, and more especially designed for spraying vines, trees, and other vegetable growth, with a prepared liquid solution for the purpose of exterminating or destroying insect pests.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a perspective view of the improvement. Fig. 2 is a reduced plan view of the same. Fig. 3 is an enlarged transverse section of the same on the line 3—3 of Fig. 2. Fig. 4 is a sectional plan view of part of the discharge pipe; and Fig. 5 is a sectional side elevation of part of the improvement on the line 5—5 of Fig. 2.

The improved sprayer is provided with a suitably constructed frame A, in which is journaled a hollow roller B, forming the liquid supply vessel and at the same time forming the means for actuating the pumps to draw the liquid from the said vessel and to force it into the spraying nozzles, as hereinafter more fully described.

The frame A is provided with a forward extension C, supported on a guide wheel D, journaled in a frame attached to the drive beam E, pivotally-connected with the extension C, as plainly illustrated in Figs. 2 and 5, so that when the draft beam E is pulled to one side, the wheel D moves in like direction to move the sprayer around groves, or turning the same at the end of the row. In one end of the hollow roller B is arranged a filling pipe F through which the liquid is introduced to the inside of the roller, the said pipe being normally closed by a suitable cap F', as plainly shown in Figs. 1 and 3.

The axles B' and B² for the roller B are both made hollow and through the axle B' extends a pipe G to permit air to pass from the outside into the interior of the hollow roller B to insure an easy working of the pumps, the said pipe G extending with its inner end close to the top of the roller B, as illustrated in Fig. 3. Through the other axle B² passes a suction pipe H, having its inner end extending close to the bottom of the roller B, the said inner end being also provided with a strainer H' to prevent impurities from passing into the suction pipe H. The outer end of the latter is connected with one or more pumps I of any approved construction, and supported on the frame A, as plainly shown in Fig. 1.

The piston rods of the pumps I are connected by pitman I' with crank arms J' of a main shaft J extending transversely on the front end of the frame A and journaled in suitable bearings attached to the frame. On the shaft J is secured a sprocket wheel J² over which passes a sprocket chain J³ also passing over a sprocket wheel B⁴ formed on the axle B' or otherwise secured to one end of the roller B, so that when the latter rolls off on the ground on the forward or backward movement of the machine, a traveling motion is given to the sprocket chain J³, whereby the main shaft J is rotated and the crank arms J' actuate the pump pistons so as to draw in through the pipe H, liquid from the roller B. The sprocket chain J³ is engaged by a tightening roller J⁴ held on the frame A to take up any slack in the said chain.

The pumps I are provided with a discharge pipe K leading to a longitudinally-extending pipe K' carrying an air reservoir K² and provided at one end with a safety valve K³ of any approved construction. A cock K⁴ is also held in the said pipe K' to close the latter whenever desired. The forward end of the pipe K' connects with a transversely-extending pipe K⁵ provided at each end with a stuffing box K⁶ engaged by an extension pipe L' mounted to slide transversely in said pipe K⁵ and stuffing box K⁶ and connected at its outer end with a vertically disposed pipe L supported on the respective side of the main frame A, as plainly shown in Fig. 1. By this arrangement the pipes L can be moved nearer to or farther from each other to suit the width of the row to be sprinkled.

Each of the pipes L is provided with longitudinally extending branch pipes N carrying spraying nozzles O of any approved construction. Any desired number of such branch pipes may be arranged on each vertical pipe L, and each of the branch pipes may be provided with a desired number of spraying nozzles O, so that when the pumps I are working, the liquid is forced through the pipes K, K', K⁵, L and N through the said spraying nozzles O to spray the vines, trees, or other vegetable growth located at the sides of the machine.

Each of the vertical pipes L is additionally supported by a pipe P and braces Q extending from the pipe P to the pipe L. Each pipe P is fitted to slide transversely in the frame A and is adapted to be secured thereto by a screw P', screwing in the frame.

When the roller B is filled with the liquid to be sprayed and the machine is moved forward over the field, then the roller B rolls off on the ground and by the mechanism above described, actuates the pumps I, so that the latter draw the liquid from the roller B and force the same through the various pipes to the nozzles O which spray the liquid onto the vines at the sides of the machine, it being understood that the machine is passed through a row of vines in the field. In order to connect the driving shaft J to, and disconnect the same from the wheel J², I mount the latter loosely on the shaft J on which is mounted to turn and to slide, a clutch adapted to be thrown in engagement with the clutch teeth on the hub of the wheel J². This clutch R is engaged by a shifting lever S under the control of the operator, so that the latter can at any time throw the pump actuating mechanism out of mesh to stop spraying while the machine is passed over the ground.

It is understood that the outer end of the pipe G is secured to the frame A so that the upper inner end of the pipe always extends to the top of the roller B, as shown in Fig. 3. It is further understood that when the machine is in action, the roller B serves as an agitator for the liquid so that the latter is continually stirred up and hence not liable to settle.

Having thus fully described my invention, I claim as new, and desire to secure by Letters Patent—

1. A sprayer comprising a frame, a hollow tank forming roller journaled in the frame, a pumping mechanism mounted on the frame, and connected with the interior of the roller, vertically extending pipes L at the sides of the frame and connected with the pump outlets, and the longitudinally extending series of pipes N extending from the pipes L one above the other along the sides of the frame and each provided with a series of spraying nozzles, substantially as set forth.

2. The combination with the frame the roller tank and the pumping mechanism connected therewith of a transverse pipe K⁵ connected with the pump outlets packing glands at the ends of the said pipe laterally adjustable pipes L having transverse extensions L' working in said glands, and the spraying pipes extending from the pipes L along opposite sides of the machine, substantially as set forth.

ALBERT G. PROVINE.

Witnesses:
R. E. CRANE,
GEO. W. EDGERTON.